Dec. 29, 1953  E. R. TWEDE  2,664,041
DAMPER ASSEMBLY
Filed Feb. 1, 1950  2 Sheets-Sheet 1

INVENTOR
ERLAND R. TWEDE
BY

Dec. 29, 1953     E. R. TWEDE     2,664,041
DAMPER ASSEMBLY
Filed Feb. 1, 1950     2 Sheets-Sheet 2
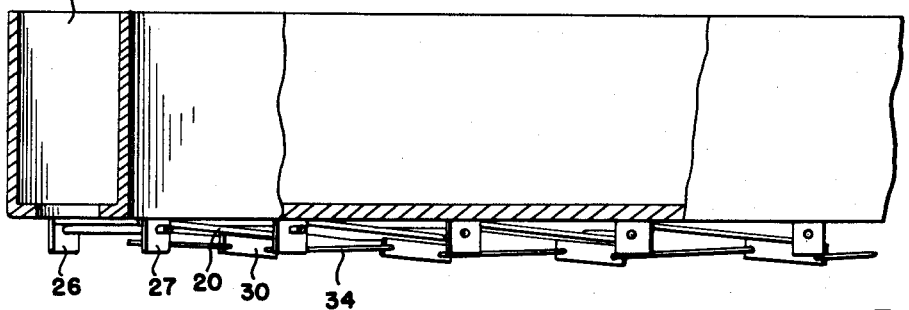
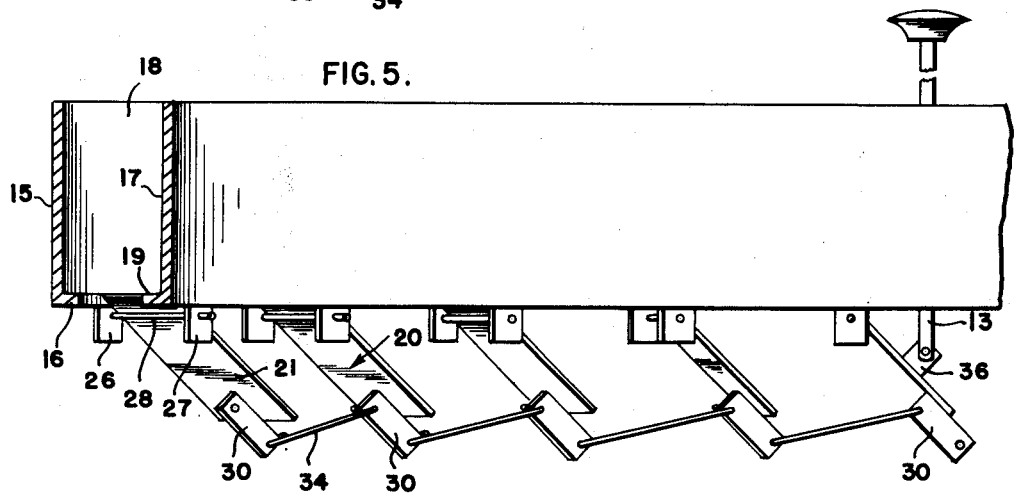
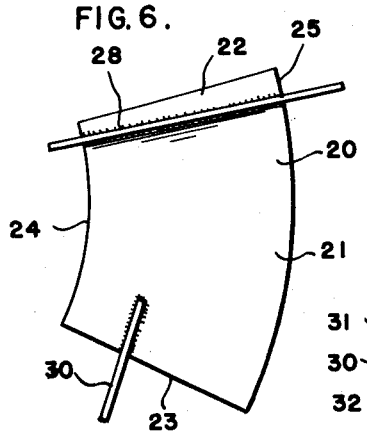
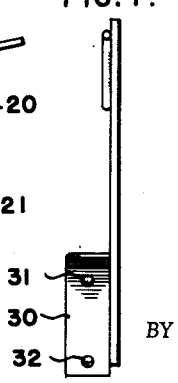
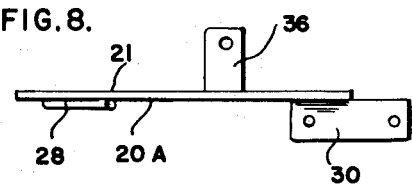
INVENTOR
ERLAND R. TWEDE Patented Dec. 29, 1953

2,664,041

UNITED STATES PATENT OFFICE 2,664,041

DAMPER ASSEMBLY

Erland R. Twede, Yuba City, Calif.

Application February 1, 1950, Serial No. 141,727

2 Claims. (Cl. 98—33)

The present invention relates to a damper installation for heating conduits, and more particularly to a damper assembly employed in a heating system wherein the hot air conduit surrounds and is concentric with the cold air conduit, the damper assembly being installed in the hot air conduit.

Broadly, the invention includes a circular cold air return pipe, a circular warm air pipe surrounding the cold air pipe, a pivotally mounted damper construction mounted in the warm air pipe in proximity to one end of the pipe, and means located externally of the pipes and operatively connected with the damper to actuate the damper.

More specifically, the damper construction comprises a plurality of louvers pivotally supported within the warm air pipe, means interconnecting adjacent louvers whereby movement of one louver will effect simultaneous movement of all louvers, and a manually operable member suitably connected to one of the louvers for imparting the desired pivotal movement to the louvers. Each louver is substantially identical in structural detail, and the inner longitudinal edge of the louver is concave, while the outer longitudinal edge is convex so that the louvers will correspond to the outer diameter of the cold air return pipe and the inner diameter of the warm air pipe.

An important object of the present invention is to provide a damper construction for installation in a heating system of the type having a cold air return conduit within the warm air conduit which is relatively simple in structural detail, positive and efficient in operation, and which can be readily installed in systems of this character at relatively little added cost.

A further object of the present invention is to provide a damper construction of the character described wherein the pivotally mounted louvers are of such configuration as to prevent any binding action between the walls of the respective conduits during operation of the damper.

Yet a further object of my invention is to provide a damper assembly of the type hereinabove set forth which includes a few essential working parts that can be cheaply manufactured and which presents few problems from the maintenance point of view.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 4 is a detailed sectional view of the pivotally mounted louvers, the louvers being in the closed position.

Figure 5 is a view similar to Figure 4 but showing the louvers in the opened position.

Figure 6 is a bottom view of one of the louver members.

Figure 7 is a side elevational view of the louver shown in Figure 6, and

Figure 8 is a side elevational view of the louver to which the control member is attached.

Figure 2:
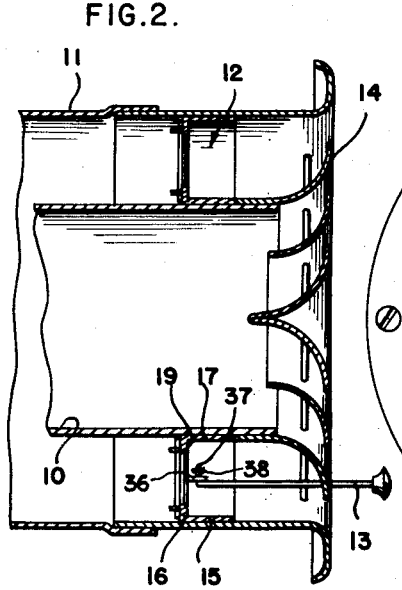
Figure 2 is a sectional view taken along the line 2—2 of Figure 1, the view looking in the direction of the arrows.
Figure 1:
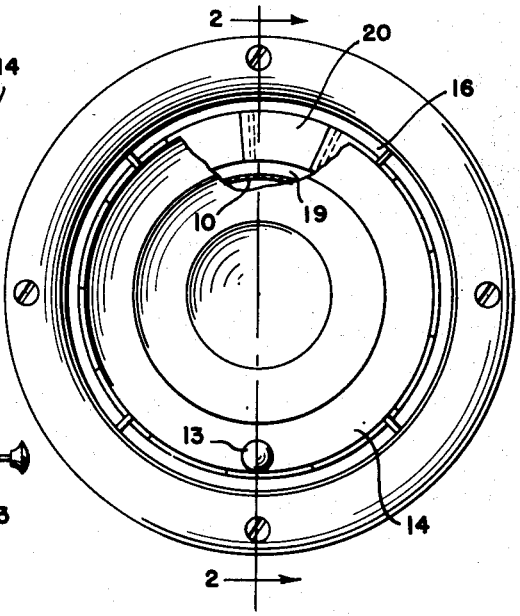
Figure 1 is a front view of the outlet of the warm air and cold air return conduits, partly broken away, and partly in section.
Figure 3:
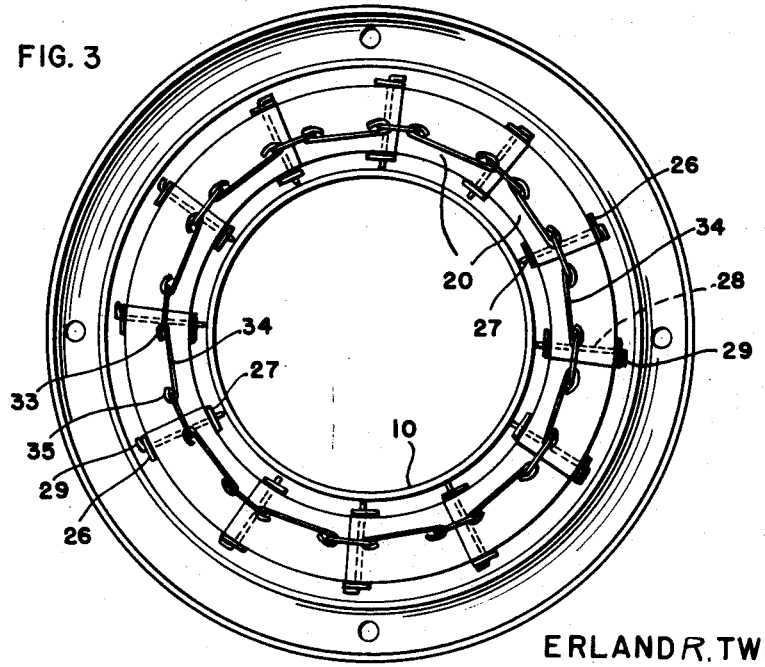
Figure 3 is a view similar to Figure 1 but being on a somewhat larger scale and with the grill omitted.

Referring to Figures 2 and 3, a circular cold air return pipe or conduit 10 is surrounded by a circular hot air conduit 11, the conduits being concentric, a damper assembly denoted generally 12 is mounted within the conduit 11 adjacent the free end of the conduit, a control lever 13 is suitably connected to the damper 12 for actuating the damper and extends to a location externally of the assembly, and a grill 14 of any suitable or convenient type is attached to the outer end of the conduit 11, for the usual purpose.

The damper assembly 12 includes an annular member 15 which is fixed to the inner diameter of the conduit at the proper location by welding or the like, and is provided with an inwardly extending flange 16. A ring-like member 17 is supported by the annular member 15 by means of suitably disposed cross members 18 which cross members may be integrally formed with the annular member and ring-like member or separate elements brazed or otherwise attached to the members. The ring-like member 17 is also provided with an inwardly extending flange 19 and, as shown in Figure 2, the flanges 16 and 19 are oppositely disposed. The ring-like member 17 also serves to support the conduit 10 within the conduit 11 and the diameter of the conduit 10 is such as to provide a friction fit between the conduit and the ring-like member 17.

A plurality of louvers 20 are adapted to rest upon the flanges 16 and 19 in the closed position and, as shown in Figure 6, each louver comprises a body portion 21 having edges 22 and 23, the edges extending angularly in opposite directions. The inner longitudinal edge of the body is concave, as shown at 24, to conform to the curvature of the outer diameter of the conduit 10, and the opposite longitudinal edge is convex, as indicated at 25, to coincide with the curvature of the inner diameter of the conduit 11. In order to pivotally connect each louver 20 to the annular member 15 and the ring-like member 17, it will be noted that the flanges 16 and 19, respectively, are cut away to provide depending ears 26 and 27, respectively, and a rod 28 extends transversely of the body 21 adjacent the edge 22 and is secured to the body by welding or the like. The rod is of a length to project beyond each longitudinal edge of the body and the end of the rod extending over the edge 24 is inserted in an opening formed in the ear 27, while the opposite end of the rod extends through a similar opening in the ear 26, and the rod is inturned, as shown at 29, to prevent its removal from the ears. Hence, it can be seen that each louver will be mounted for upward and downward pivotal movement relative to the flanges 16 and 19.

As previously mentioned, the louvers 20 are adapted to be moved simultaneously, and to accomplish this end, it will be seen in Figures 6 and 7 that a plate 30 is welded or otherwise conveniently attached to the body 21 near the edge 23 and the plate extends beyond the edge 23. The plate is further provided with a pair of spaced apertures 31 and 32, the aperture 31 receiving hooked end 33 of a clip 34 and opposite hooked end 35 of the clip being adapted to engage aperture 32 of the plate 30 on the adjacent louver 20.

To impart the desired pivotal movement to the louvers, it will be noted that one of the louvers, indicated 20A, is provided with an ear 36 which is attached to the opposite or upper face of the body, and the free or inner end of the control lever 13 is bent at right angles, as shown at 37, to extend through the opening in the ear and maintained against removal from the ear by a pin or the like 38.

While the operation of the damper is believed apparent, it will be seen that with the control lever 13 in its completely withdrawn position, the louvers 20 will be resting upon the flanges 16 and 19. However, upon inward movement of the control lever, the louver 20A will be moved downwardly about its point of pivot and this pivotal movement will be instantaneously imparted to the remaining louvers through the connecting clips 34. The arrangement provides a refinement of control and can be very easily and quickly operated through the medium of the lever 13. The unit is not complex in either structural detail or operation, thereby enabling the assembly to be readily and inexpensively manufactured.

Instead of the rod 28 and the plate 30 being separate members attached to the body 21, these elements may be stamped out during the process of manufacture, although it is felt that a sturdier construction is effected by having the members as individual entities and thereafter attached to the body.

The invention is not to be confined to any strict conformity with the showing in the drawing, but may be changed or modified so long as such changes or modifications mark no material departure from the salient features of the invention as expressed in the appended claims.

I claim:

1. In a damper assembly for installation in a circular hot air conduit which surrounds a circular cold air return conduit, spaced apart annular supporting members within the hot air conduit, a plurality of louvers pivotally mounted to said annular supporting members and extending completely around said annular supporting members, a plate extending forwardly from the front end of each louver, clip means connecting the front end of each plate with the rear end of the plate on an adjacent louver, and an operating lever secured to one of said louvers so that movement of the operating lever will impart simultaneous pivotal movement to all of the louvers through said plates and clip means.

2. In a damper assembly for installation in a heating conduit of the type including a circular inner duct and a circular outer concentric duct, the respective ducts conducting air of different temperatures, a plurality of louvers disposed in and extending completely around said outer duct, complemental means carried by the outer duct and each louver for mounting the louvers for pivotal movement within the outer duct, the louvers being of such length that the front end of each louver may overlap the rear end of the adjacent louvers so that the outer duct is closed with the louvers in overlapped relation, a plate secured to and extending forwardly from the front end of each louver, clip means connecting the front end of each plate with the rear end of the plate of an adjacent louver, and an operating lever attached to one of the louvers so that movement of the lever will impart simultaneous pivotal movement to all of the louvers through said link means.

ERLAND R. TWEDE.

References Cited in the file of this patent

UNITED STATES PATENTS

| Number | Name | Date |
|---|---|---|
| 192,181 | Morrison | June 19, 1877 |
| 1,706,338 | Workman | Mar. 19, 1929 |
| 1,735,760 | Howard | Nov. 12, 1929 |
| 2,403,291 | Kurth | July 2, 1946 |
| 2,513,644 | Hagen | July 4, 1950 |

FOREIGN PATENTS

| Number | Country | Date |
|---|---|---|
| 668,164 | Germany | Nov. 26, 1938 |
| 706,489 | Germany | May 28, 1941 |